Dec. 9, 1969          H. U. LEFFERS          3,482,487
PISTON SYSTEM WITH BALL-HEAD LINK
Filed Dec. 11, 1967

INVENTOR.
HANS ULRIK LEFFERS

United States Patent Office 3,482,487
Patented Dec. 9, 1969

3,482,487
PISTON SYSTEM WITH BALL-HEAD LINK
Hans Ulrik Leffers, Sonderborg, Denmark, assignor to Danfoss A/S, Nordborg, Denmark, a company of Denmark
Filed Dec. 11, 1967, Ser. No. 689,569
Claims priority, application Germany, Dec. 13, 1966, D 51,765
Int. Cl. F01b *31/00;* F16j *1/22;* F16c *11/06*
U.S. Cl. 92—176                           7 Claims

ABSTRACT OF THE DISCLOSURE

The invention relates to a piston and connecting rod assembly. The connecting rod has a spherically or ball shaped end portion and the piston includes a bearing block having a semispherically shaped recess which receives the ball shaped end portion. The bearing block has a depending skirt portion which is lined with a resilient layer of material such as a plastic material. In the manufacturing of the assembly the bearing block skirt is inwardly flanged with a flanging tool so that the layer of plastic material is pressed into firm engagement with the ball shaped portion of the connecting rod. After the flanging force is withdrawn there is a slight retreating or springing back of the skirt portion but the space vacated by the retreating skirt portion becomes occupied by the plastic material by reason of its resilience. There is thus no resulting play between the connecting rod end portion and the bearing block because the space therebetween is fully occupied by the plastic material. After the connecting rod is attached to the bearing block as described, the bearing block is inserted into and attached to a cup shaped piston member.

---

Figure 1:
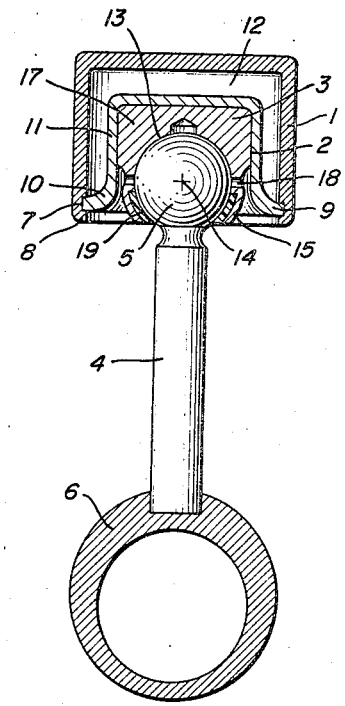

The present invention relates to a piston system with a ball-head link between the connecting rod and the piston, in which link the spherical seating has an extension which is flanged over after the ball has been inserted.

Piston system are known in which the ball is retained in the associated spherical seating by means of an additional fixing element. The fixing element must then be secured to the spherical seating by some auxiliary means. This cannot be achieved in the case of smaller pistons. Moreover, such a construction is expensive.

Attempts have also been made to form the spherical seating and the fixing elements in one piece, by flanging over an extension provided on the spherical seating, after the ball has been inserted. This in itself very advantageous solution does not however enable the ball to be mounted in a completely play-free manner, since the known bearing metals all have a more or less great inherent elasticity. If they are curved onto the ball until no play exists, they then spring back a little so that a small gap occurs. The greater the efforts to obtain better flanging characteristics without spring-back, the poorer the bearing properties become.

The object of the invention is to provide a ball-head link for a piston system wherein no additional fixing means are required, but wherein, despite this, a play-free mounting of the ball is insured.

According to the invention, this object is achieved in that the extension of the spherical seating has on its inside a layer of resiliently compressible material.

When the extension is flanged over, this resilient layer is compressed. If the flanged-over continuation then springs back a little, the resilient material compensates for this by its own stretch. When choosing the material for the spherical seating, according to the invention attention has therefore only to be paid to the bearing properties and not so much therefore to the spring-free flanging characteristics. This means that a large number of normal bearing materials can be used which hitherto have been unsuitable for such spherical seatings, for example standard bearing bronze which is preferred because of its ability to absorb oil. Other bearing materials, such as brass or copper-nickel-silicon-alloys can also be used without the ball lying loose in the seating.

Conversely, the material of the resilient layer can be selected from large number of materials, since the mechanical load between the ball and this layer is considerably lower than between the ball and the seating, since only the forces necessary for suction have to be transmitted through this point. In particular, plastics materials can be used for the layer, the choice preferably being made from the large number of plastics materials having good bearing properties.

The choice of material for the layer will also depend upon the application in question. In the case of a piston compressor of a refrigerating machine, the layer must be made of a refrigerant-resisting plastics material. In the case of pistons where a higher temperature occurs, the plastics material must possess a suitable heat-resistance.

Among the plastics materials which not only possess the necessary resilient properties, but also meet the requirements as regards bearing properties, ability to absorb oil, resistance to temperature, resistance to refrigerants, etc., are fluorized polyethylenes, for example, polytetrafluoroethylene or polytrifluoroethylene.

In the case of many plastics materials which can be considered as the material for the layer, it is expedient to keep the thermal load below the actual piston temperature. For such a case it is recommended that the measures described in German Patent Application D 50585 XII/47f be taken. In particular, the piston can be formed as a pot-shaped case and the spherical seating as a component which is inserted therein and which is fitted at a distance from the inside walls of the piston case and is secured by way of a flange at the open end of the piston case. Here, the space formed between the piston case and the inserted component can be hermetically sealed and partially evacuated.

Figure 2:
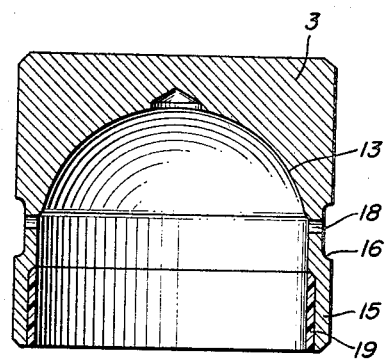

The invention will now be described in more detail by reference to the embodiment illustrated in the drawing wherein:

FIG. 1 is a longitudinal section through an embodiment in accordance with the invention and FIG. 2 is a longitudinal section through the spherical seating before the flanging operation is carried out.

The piston system consists of a pot-shaped case 1, an insert 2, a bearing block 3, a connecting rod 4 having a spherical head 5, and a crank-pin bearing 6. The piston case 1 is deep-drawn from sheet and is provided at its rear end with a circumferential recess 7 and a flanged edge 8. The insert 2, likewise deep-drawn from sheet, has a flange 9 which is connected directly with a cylindrical wall 11 by way of a transition portion 10. The insert 2 is fitted in the circumferential recess 7 by its flange 9 and is secured by flanging over of the edge 11. These two parts 1 and 2 are then soldered together in a protective gas to give a hermetic seal, so that a sealed space 12 is formed between the parts 1 and 2, in which space a protective gas, for example $CO_2$, is occluded.

The bearing block 3 forms a spherical seating 13 shaped as a cusp which terminates a little above the centre point 14 of the spherical seating. Adjacent thereto and on the outside is an extension 15 the inside of which corresponds to the diameter of the ball 5. On its outside wall, the extension 15 has a circumferential recess 16 which, when the bearing block 3 is fitted in the insert 2, limits the actual attachment area to the cylindrical portion 17 and prevents pressure from occurring in the region of the greatest diameter of the ball 5. Bores 18, extending inwardly from the circumferential recess 16, serve the purpose of improviding the supply of lubricant.:

On its inside, the extension 15 is provided with a layer 19 made from a resilient plastics material. In assembling the system, the bearing block 3 is pushed over the ball 5 and the extension 15 is then inwardly flanged by means of a flanging tool. Here, the extension 15 can be curved closely onto the ball, the resilient layer 18 being thereby compressed. The subsequent spring-back of the bearing metal of which the block 3 is made is compensated by the resilience of the material of the layer. After the bearing block 3 has been connected to the ball in this manner, the hollow piston 1, 2 is shrunk thereover, for example by heating the piston to 300° C. and allowing it to cool again after it has been fitted.

In this embodiment the heat-transfer between the hot piston 1 and the spherical seating or the resilient layer is extremely slight, since only a little heat can be transferred by radiation through the cavity 12 under negative pressure, and only a small cross-section is available for the flow of heat by way of the flange 9 which, in addition, is positioned at that side of the piston to which a coolant can be directed.

The arrangement described represents only one example. The spherical seating can be formed directly on or attached to the piston. The spherical seating can also be connected with the connecting rod and the ball can be fitted on the piston. A large variety of materials and not only the polytrifluorochloroethylene, particularly mentioned for refrigerating machines, can be considered for the resilent layer. Another very suitable material, particularly for air compressors, is polyamide or polyurethane.

What is claimed is:

1. A piston and connecting rod assembly comprising, a cup shaped piston, a metal bearing block in said piston having a semispherically shaped recess, a connecting rod having a spherically shaped ball at one end thereof, said ball being disposed in said recess in direct contact with the surface of said recess, said bearing block having a depending skirt portion in generally uniformly spaced surrounding relation to a lower portion of said ball beneath the center thereof, a layer of resilient plastic material compressed between said skirt portion and said lower portion of said ball, said layer occupying substantially the entire space between said skirt portion and said ball and exerting pressure against said skirt and said ball in directions normal to the surface of said lower portion of said ball.

2. A piston and connecting rod assembly according to claim 1 wherein said plastic material has the characteristics of a bearing material.

3. A piston and connecting rod assembly according to claim 1 wherein said plastic material has heat resistant characteristics up to the anticipated temperature to which it will be subjected in operation.

4. A piston and connecting rod assembly according to claim 1 wherein said piston includes an outer part and a cup shaped insert is disposed between said outer part and said bearing block, said insert being in spaced relation to the interior of said outer part to form a chamber therebetween, said insert having a flange at the open end thereof attached to said outer part, said chamber being hermetically sealed by said flange.

5. A piston and connecting rod assembly according to claim 4 wherein a gas in said chamber has a lesser pressure than atmospheric pressure.

6. A piston and connecting rod assembly according to claim 1 wherein said plastic material is fluorized polyethylene.

7. A piston and connecting rod assembly according to claim 1 wherein said bearing block recess comprises a seating of bearing bronze.

References Cited

UNITED STATES PATENTS

| | | | |
|---|---|---|---|
| 1,228,049 | 5/1917 | Rich | 92—176 |
| 1,878,566 | 9/1932 | Woolson | 123—41.16 |
| 2,541,160 | 2/1951 | Heim | 308—72 X |
| 3,108,830 | 10/1963 | Fierstine | 287—87 |
| 3,173,344 | 3/1965 | Mongitore | 92—187 |
| 3,342,513 | 9/1967 | Melton et al. | 308—72 X |

CARROLL B. DORITY, Jr., Primary Examiner

U.S. Cl. X.R.

92—172, 187; 287—20, 90